(12) United States Patent
Chung et al.

(10) Patent No.: US 10,574,997 B2
(45) Date of Patent: Feb. 25, 2020

(54) NOISE LEVEL CONTROL IN VIDEO CODING

(71) Applicant: Apple Inc., Cupertino, CA (US)

(72) Inventors: Chris Y. Chung, Sunnyvale, CA (US); Mei Guo, San Jose, CA (US); Hsi-Jung Wu, San Jose, CA (US); Jingteng Xue, Santa Clara, CA (US); Jun Xin, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/796,313

(22) Filed: Oct. 27, 2017

(65) Prior Publication Data

US 2019/0132594 A1 May 2, 2019

(51) Int. Cl.
*H04N 19/176* (2014.01)
*H04N 19/117* (2014.01)
*H04N 19/147* (2014.01)
*H04N 19/82* (2014.01)
*H04N 19/105* (2014.01)
*H04N 19/196* (2014.01)

(52) U.S. Cl.
CPC ......... *H04N 19/147* (2014.11); *H04N 19/105* (2014.11); *H04N 19/117* (2014.11); *H04N 19/176* (2014.11); *H04N 19/196* (2014.11); *H04N 19/82* (2014.11)

(58) Field of Classification Search
CPC .. H04N 19/147; H04N 19/176; H04N 19/117; H04N 19/17; H04N 19/19; H04N 19/61; H04N 19/103; H04N 19/82; H04N 19/86
See application file for complete search history.

(56) References Cited

U.S. PATENT DOCUMENTS

| | | | | |
|---|---|---|---|---|
| 2006/0262849 | A1* | 11/2006 | Tsai | H04N 5/147 375/240.12 |
| 2008/0151081 | A1* | 6/2008 | Frank | H04N 5/365 348/241 |
| 2012/0026288 | A1* | 2/2012 | Tourapis | H04N 19/597 348/43 |
| 2012/0087411 | A1* | 4/2012 | Haskell | H04N 19/61 375/240.16 |
| 2013/0121407 | A1* | 5/2013 | Chono | H04N 19/61 375/240.03 |
| 2013/0235931 | A1* | 9/2013 | Su | H04N 19/46 375/240.12 |
| 2014/0192267 | A1* | 7/2014 | Biswas | G06T 5/002 348/701 |
| 2016/0261885 | A1* | 9/2016 | Li | H04N 19/176 |
| 2016/0269725 | A1* | 9/2016 | Mrak | H04N 19/132 |
| 2016/0269739 | A1* | 9/2016 | Tourapis | H04N 19/70 |
| 2018/0343455 | A1* | 11/2018 | Jang | H04N 19/105 |
| 2018/0376153 | A1* | 12/2018 | Gokhale | H04N 19/19 |

\* cited by examiner

*Primary Examiner* — Alison Slater
(74) *Attorney, Agent, or Firm* — BakerHostetler (57) ABSTRACT

Systems and methods are disclosed for coding pixel blocks of an input frame in which coding costs of a plurality of candidate coding modes are estimated. A coding cost of a candidate coding mode may be estimated based on noise estimate associated with the candidate coding mode. A coding mode for the input pixel block may be selected based on a comparison of the estimated coding costs of the plurality of candidate coding modes. The input pixel block may then be coded according to the selected coding mode.

30 Claims, 6 Drawing Sheets

NOISE LEVEL CONTROL IN VIDEO CODING

BACKGROUND

The present disclosure relates to video coding and, in particular, to techniques for selecting coding modes in predictive coding systems.

Many consumer electronic devices perform video coding and/or decoding. For example, many devices download coded representations of videos from media sources, decode those coded representations and display decoded videos on a local display. As another example, many devices provide videoconferencing services in which video data at one device is captured, coded to achieve bandwidth conservation, and transmitted to another device, where it is decoded and displayed.

Video coding often exploits spatial and/or temporal redundancies in video data to achieve bandwidth compression. Spatial redundancies can be exploited by, for a given portion of a frame of video data, identifying a previously-coded portion of the same frame that is similar in content to the portion being coded. If a similar portion can be identified, the new data may be predicted from the previously-coded data—it is coded differentially with respect to the matching portion. Temporal redundancies can be exploited by identifying a portion of a previously-coded frame that is similar in content to a portion being coded and, if a similar portion can be identified, the new portion is predicted from the previously-coded data—it is coded differentially with respect to the matching portion from the other frame. In either case, the previously-coded matching content serves as a prediction reference for the new portion being coded.

A variety of prediction modes are available for coding video. Video coders often select from a variety of candidate prediction modes a coding mode based on rate-distortion estimation techniques. Coding "cost" of a candidate mode may be modeled as $$J(m) = D(m) + \lambda \cdot R(m), \quad (1)$$

where $D(m)$ is typically Sum of Squared Error (SSE) between source block and the reconstructed block encoded using the mode "m," $R(m)$ is the number of bits used to code the block using this mode, and $\lambda$ is a parameter that controls the tradeoff between rate and distortion. Conventional cost modeling techniques, however, do not generate coded video data that, when decoded, appears natural. Accordingly, there is a need in the art for an improved cost modeling techniques for video coding and decoding systems.

DETAILED DESCRIPTION

Aspects of the present disclosure describe techniques for coding pixel blocks of an input frame in which coding costs of a plurality of candidate coding modes are estimated, in which estimates of distortion include an estimate of noise of each respective candidate coding mode. Thus, evaluation of each coding mode may involve searching for a prediction reference for a pixel block according to the mode, and estimating coding cost of the respective candidate coding mode based at least in part on an estimate of noise associated with the respective coding mode. A coding mode for the input pixel block may be selected based on a comparison of the coding costs of the candidate coding modes, and the input pixel block may be coded according to the selected coding mode. By estimating noise associated with the candidate coding modes and, in particular, employing techniques to maintain consistent levels of noise across different frames of a coded video sequence, it is expected that perceived quality of coding will be improved.

Figure 1:
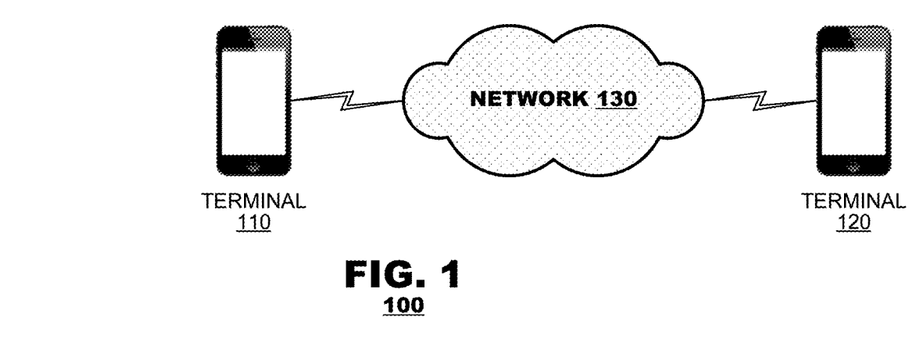
FIG. 1 illustrates a system according to an aspect of the present disclosure.

FIG. 1 illustrates a system 100 according to an aspect of the present disclosure. The system 100 may include a pair of terminal devices ("terminals," for convenience) 110, 120 provided in communication via a communication network 130. The terminals 110, 120 may be engaged in either unidirectional or bidirectional exchange of video over the network 130. Typically, a first terminal (say, terminal 110) acquires video to be transmitted to a second terminal 120, codes the video data to reduce its transmitted bandwidth, and transmits the coded video across the network 130. The second device 120 may receive the coded video from the network 130, decode it and consume the video.

If bidirectional exchange of video is performed, then the second terminal 120 may acquire its own video to be transmitted to the first terminal 110, it may code the second video to reduce its transmitted bandwidth, and it may transmit the coded video across the network 130. The first terminal 110 may receive the second coded video from the network 130, decode it and consume the video. The coding/decoding processes for each direction of video exchange may operate independently of each other and, therefore, it is sufficient to describe coding/decoding processes in only one direction. Herein, the first terminal 110 will be described as a "coding terminal" and the second terminal 120 will be described as a "decoding terminal," for ease of discussion.

Typically, the video within a coding terminal 110 is presented as a sequence of frames (not shown) having a predetermined frame rate and resolution. The terminal 110 may apply bandwidth compression operations to the video to exploit spatial and/or temporal redundancies in the video to generate a coded video sequence that occupies less bandwidth than the source video sequence. The terminal 110 may apply compression operations that are defined by one or more inter-operability standards, such as the ITU-T H.265, H.264, H.263 or related coding protocols. The coded video data may be represented by a syntax, defined by the coding protocol, that indicates coding operations applied by the terminal 110.

Typically, a coding terminal 110 codes a source video sequence on a frame-by-frame basis. Coding often occurs by motion-compensated prediction in which content from an input frame is coded differentially with respect to previously-coded data already processed by the coding terminal 110. For example, content of an input frame may be coded by intra-prediction (commonly "I coding"), which causes the content to be coded with reference to other, previously-coded content from the same input frame. Alternatively, the content may be coded by an inter-prediction mode, called "P coding," which causes the content to be coded with reference to content from a single previously-coded frame. As yet another option, the content may be coded by another inter-prediction mode, called "B coding," which causes the content to be coded with reference to a pair of previously-coded frames. And still other coding modes are available, such as "SKIP" mode coding, which causes content of an input frame not to be coded at all but instead to re-use recovered content of a previous frame.

Once a coding terminal 110 selects a coding mode for an input frame, the coding terminal 110 also may select a variety of other coding parameters such as quantization parameters, choice of in loop filtering, type of transform and the like. The coding terminal 110 also may select other coding parameters independently of the coding mode applied to each frame, such as frame decimation and/or frame resolution adaptation. All of these selections of coding parameters provide their own contribution to an amount bandwidth compression achieved by the coding/decoding process and also incur their own cost in terms of the artifacts that are created.

Decoding terminals 120 may generate recovered video from coded video. Typically, the recovered video is a replica of the source video that was coded by the coding terminal 110 but it possess coding errors due to data loss incurred by the coding process. Recovered video generated by a decoding terminal 120 may be output to a display, stored at the terminal 120 for later use or consumed by other applications (not shown) executing on the decoding terminal 120.

In the example of FIG. 1, coding operations are illustrated as being performed at a coding terminal 110. Coding operations may be performed at smart phones but, in other aspects of the disclosure, coding operations may be performed by other computing equipment, such as, tablet computers, laptop computers, personal computers, server computers, and media devices. Coding operations may be performed either for real time delivery of video or store and forward delivery. In this latter case, a coding terminal 110 may output coded video data to a distribution server (not shown) where it is stored for delivery to decoding terminals 120. Typically, in the store-and-forward distribution model, the coded video data is downloaded to a decoding terminal 120 in response to decoder-initiated requests, made by HTTP or similar protocol.

Similarly, decoding terminals 120 are illustrated in FIG. 1 as smart phones, tablet computers and/or display devices. Decoding operations may be performed by other computing equipment, such as laptop computers, personal computers, media players, display devices and/or dedicated videoconferencing equipment.

The network 130 represents any number of communication and/or computer networks that provide communication between a coding terminal 110 and a decoding terminal 120, including circuit switched networks and/or packet switched networks such as the Internet. The architecture and operation of the network 130 is immaterial to the present discussion unless described hereinbelow.

Figure 2:
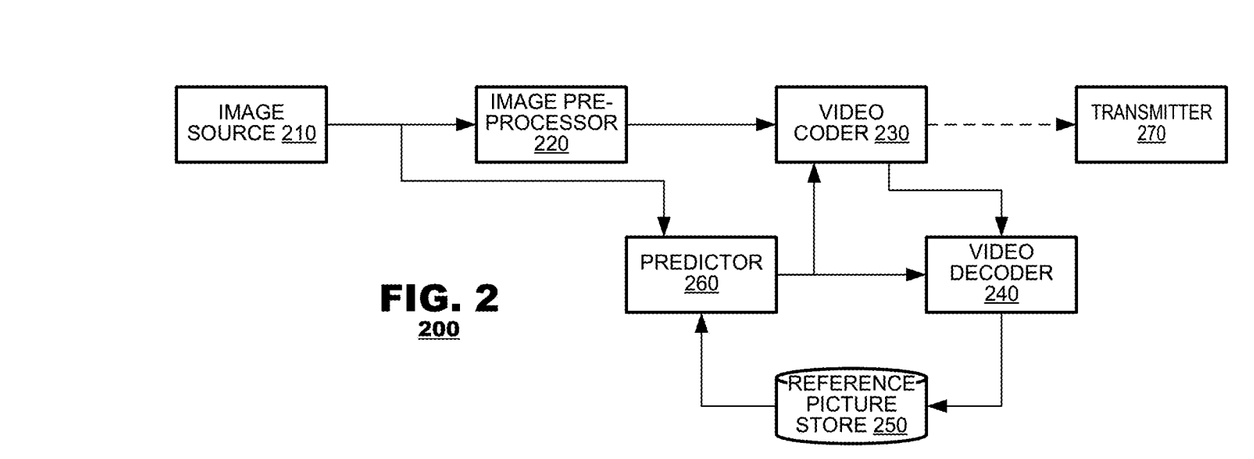
FIG. 2 is a functional block diagram of a coding device according to an aspect of the present disclosure.

FIG. 2 is a functional block diagram of a coding device 200 according to an aspect of the present disclosure. The coding device 200 may include an image source 210, a pre-processing system 220, a video coder 230, a video decoder 240, a reference picture store 250, a predictor 260, and a transmitter 270. The block diagram of FIG. 2 may find application in a coding terminal 110 (FIG. 1).

The image source 210 may provide video data to be coded. The pre-processing system 220 may process video data to condition it for coding by the video coder 230. For example, the pre-processing system 220 may parse individual frames into coding units or other arrays of pixel data (called "pixel blocks," for convenience) that will be coded in sequence by the video coder 230. The pre-processor may perform partitioning and content searches. The pre-processor 220 also may perform other operations, such as filtering, to facilitate coding.

The video coder 230 may generate a coded representation of its input image data, typically by exploiting spatial and/or temporal redundancies in the image data. The video coder 230 may perform coding parameter assignment and coding of video. The video coder 230 may output a coded representation of the input data that consumes less bandwidth than the original source video when transmitted and/or stored.

The video decoder 240 may invert coding operations performed by the video encoder 230 to obtain recovered video from the coded video data. As discussed, the coding processes applied by the video coder 230 are lossy processes, which cause the recovered video to possess various errors when compared to the original picture. The video decoder 240 may reconstruct pictures of select coded pictures, which are designated as "reference pictures," and store the decoded reference pictures in the reference picture store 250. In the absence of transmission errors, the decoded reference pictures will replicate decoded reference pictures obtained by a decoding terminal 120 (FIG. 1).

The predictor 260 may select prediction references for new input pictures as they are coded. For each portion of the input picture being coded (called a "pixel block" for convenience), the predictor 260 may select a coding mode and identify a portion of a reference picture that may serve as a prediction reference search for the pixel block being coded. The coding mode may be an intra-coding mode, in which case the prediction reference may be drawn from a previously-coded (and decoded) portion of the picture being coded. Alternatively, the coding mode may be an inter-coding mode, in which case the prediction reference may be drawn from another previously-coded and decoded picture.

When an appropriate prediction reference is identified, the predictor 260 may furnish the prediction data to the video coder 230. The video coder 230 may code input video data differentially with respect to prediction data furnished by the predictor 260. Typically, prediction operations and the differential coding operate on a pixel block-by-pixel block basis. Prediction residuals, which represent pixel-wise differences between the input pixel blocks and the prediction pixel blocks, may be subject to further coding operations to reduce bandwidth further.

As indicated, the coded video data output by the video coder 230 should consume less bandwidth than the input data when transmitted and/or stored. The image source device 200 may output the coded video data to an output device 270, such as a transmitter, that may transmit the coded video data across a communication network 130 (FIG. 1). Alternatively, the image source device 200 may output coded data to a storage device (not shown) such as an electronic-, magnetic- and/or optical storage medium.

Figure 3:
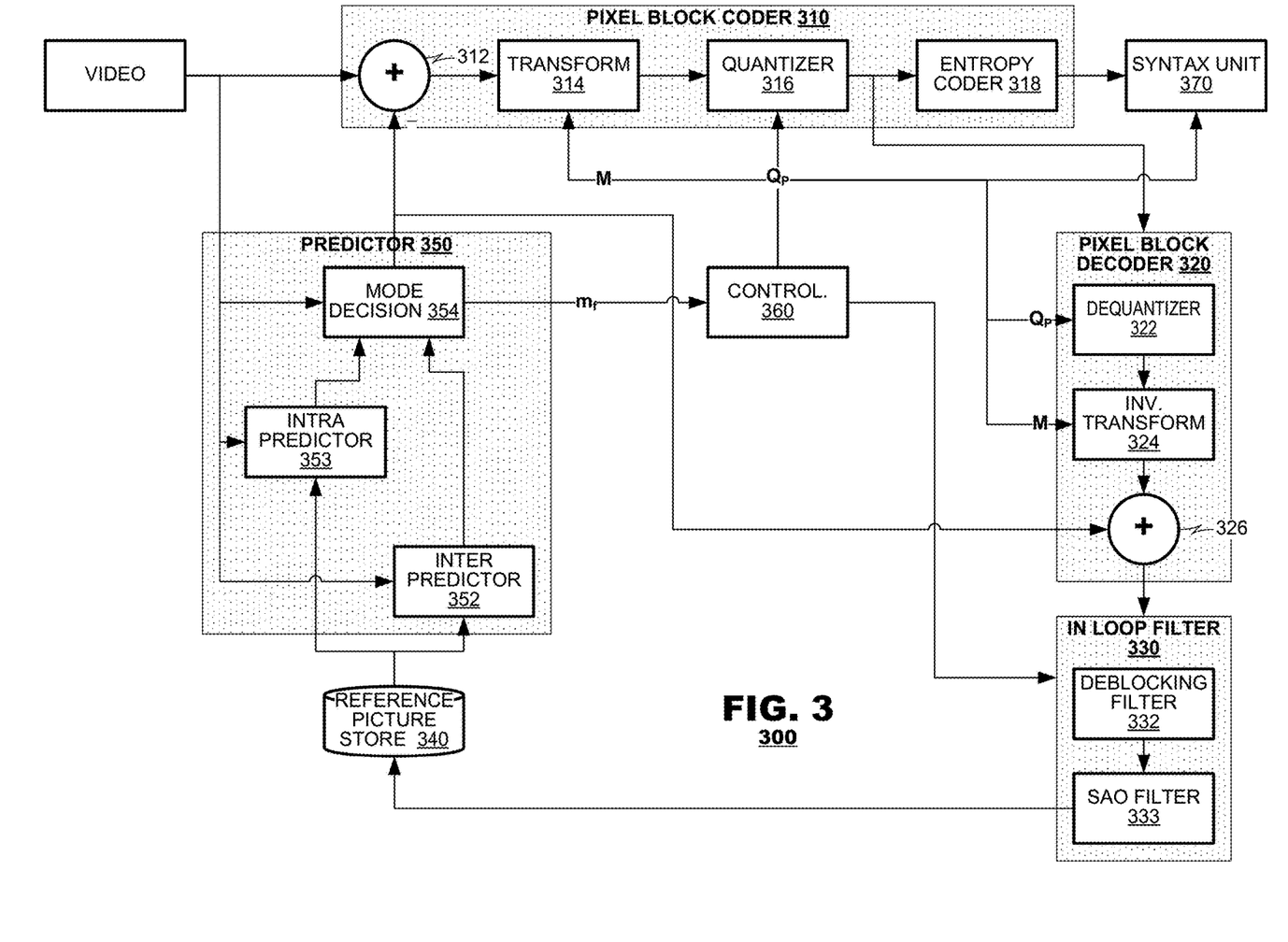
FIG. 3 is a functional block diagram of a coding system according to an aspect of the present disclosure.

FIG. 3 is a functional block diagram of a coding system 300 according to an aspect of the present disclosure. The system 300 may include a pixel block coder 310, a pixel block decoder 320, an in-loop filter system 330, a reference picture store 340, a predictor 350, a controller 360, and a syntax unit 370. The pixel block coder and decoder 310, 320 and the predictor 350 may operate iteratively on individual pixel blocks of a frame. The predictor 350 may predict data for use during coding of a newly-presented input pixel block. The pixel block coder 310 may code the new pixel block by predictive coding techniques and present coded pixel block data to the syntax unit 370. The pixel block decoder 320 may decode the coded pixel block data, generating decoded pixel block data therefrom. The in-loop filter 330 may perform various filtering operations on a decoded picture that is assembled from the decoded pixel blocks obtained by the pixel block decoder 320. The filtered picture may be stored in the reference picture store 340 where it may be used as a source of prediction of a later-received pixel block. The syntax unit 370 may assemble a data stream from the coded pixel block data, which conforms, to a governing coding protocol.

The pixel block coder 310 may include a subtractor 312, a transform unit 314, a quantizer 316, and an entropy coder 318. The pixel block coder 310 may accept pixel blocks of input data at the subtractor 312. The subtractor 312 may receive predicted pixel blocks from the predictor 350 and generate an array of pixel residuals therefrom representing a difference between the input pixel block and the predicted pixel block. The transform unit 314 may apply a transform to the sample data output from the subtractor 312, to convert data from the pixel domain to a domain of transform coefficients. The quantizer 316 may perform quantization of transform coefficients output by the transform unit 314. The quantizer 316 may be a uniform or a non-uniform quantizer. The entropy coder 318 may reduce bandwidth of the output of the coefficient quantizer by coding the output, for example, by variable length code words.

The transform unit 314 may operate in a variety of transform modes as determined by the controller 360. For example, the transform unit 314 may apply a discrete cosine transform (DCT), a discrete sine transform (DST), a Walsh-Hadamard transform, a Haar transform, a Daubechies wavelet transform, or the like. In an aspect, the controller 360 may select a coding mode M to be applied by the transform unit 315, may configure the transform unit 315 accordingly and may signal the coding mode M in the coded video data, either expressly or impliedly.

The quantizer 316 may operate according to a quantization parameter $Q_P$ that is supplied by the controller 360. In another aspect, the quantization parameter $Q_P$ may be applied to the transform coefficients as a multi-value quantization parameter, which may vary, for example, across different coefficient locations within a transform-domain pixel block. Thus, the quantization parameter $Q_P$ may be provided as a quantization parameters array.

The entropy coder 318, as its name implies, may perform entropy coding of data output from the quantizer 316. For example, the entropy coder 318 may perform run length coding, Huffman coding, Golomb coding and the like.

The pixel block decoder 320 may invert coding operations of the pixel block coder 310. For example, the pixel block decoder 320 may include a dequantizer 322, an inverse transform unit 324, and an adder 326. The pixel block decoder 320 may take its input data from an output of the quantizer 316. Although permissible, the pixel block decoder 320 need not perform entropy decoding of entropy-coded data since entropy coding is a lossless event. The dequantizer 322 may invert operations of the quantizer 316 of the pixel block coder 310. The dequantizer 322 may perform uniform or non-uniform de-quantization as specified by the decoded signal $Q_P$. Similarly, the inverse transform unit 324 may invert operations of the transform unit 314. The dequantizer 322 and the inverse transform unit 324 may use the same quantization parameters $Q_P$ and transform mode M as their counterparts in the pixel block coder 310. Quantization operations likely will truncate data in various respects and, therefore, data recovered by the dequantizer 322 likely will possess coding errors when compared to the data presented to the quantizer 316 in the pixel block coder 310.

The adder 326 may invert operations performed by the subtractor 312. It may receive the same prediction pixel block from the predictor 350 that the subtractor 312 used in generating residual signals. The adder 326 may add the prediction pixel block to reconstructed residual values output by the inverse transform unit 324 and may output reconstructed pixel block data.

The in-loop filter 330 may perform various filtering operations on recovered pixel block data. For example, the in-loop filter 330 may include a deblocking filter 332 and a sample adaptive offset ("SAO") filter 333. The deblocking filter 332 may filter data at seams between reconstructed pixel blocks to reduce discontinuities between the pixel blocks that arise due to coding. SAO filters may add offsets to pixel values according to an SAO "type," for example, based on edge direction/shape and/or pixel/color component level. The in-loop filter 330 may operate according to parameters that are selected by the controller 360.

The reference picture store 340 may store filtered pixel data for use in later prediction of other pixel blocks. Different types of prediction data are made available to the predictor 350 for different prediction modes. For example, for an input pixel block, intra prediction takes a prediction reference from decoded data of the same picture in which the input pixel block is located. Thus, the reference picture store 340 may store decoded pixel block data of each picture as it is coded. For the same input pixel block, inter prediction may take a prediction reference from previously coded and decoded pictures that are designated as reference pictures. Thus, the reference picture store 340 may store these decoded reference pictures.

As discussed, the predictor 350 may supply prediction data to the pixel block coder 310 for use in generating residuals. The predictor 350 may include an inter predictor 352, an intra predictor 353 and a mode decision unit 354. The inter predictor 352 may receive pixel block data representing a new pixel block to be coded and may search reference picture data from store 340 for pixel block data from reference pictures for use in coding the input pixel block. The inter predictor 352 may support a plurality of prediction modes, such as P mode coding and B mode coding. The inter predictor 352 may select an inter prediction mode and an identification of candidate prediction reference data that provides a closest match to the input pixel block being coded. The inter predictor 352 may generate prediction reference metadata, such as motion vectors, to identify which portion(s) of which reference pictures were selected as source(s) of prediction for the input pixel block.

The intra predictor 353 may support Intra (I) mode coding. The intra predictor 353 may search from among pixel block data from the same picture as the pixel block being coded that provides a closest match to the input pixel block. The intra predictor 353 also may generate prediction reference indicators to identify which portion of the picture was selected as a source of prediction for the input pixel block.

The mode decision unit 354 may select a final coding mode $m_f$ to be applied to the input pixel block. Typically, as described above, the mode decision unit 354 selects the prediction mode as an optimization of coding rate and distortion in which a coding mode that minimizes rate-distortion cost is selected. Exceptions may arise when coding modes are selected to satisfy other policies to which the coding system 300 adheres, such as satisfying a particular channel behavior, or supporting random access or data refresh policies. When the mode decision selects the final coding mode, the mode decision unit 354 may output a selected reference block from the store 340 to the pixel block coder and decoder 310, 320 and may supply to the controller 360 an identification of the selected prediction mode along with the prediction reference indicators corresponding to the selected mode.

The controller 360 may control overall operation of the coding system 300. The controller 360 may select operational parameters for the pixel block coder 310 and the predictor 350 based on analyses of input pixel blocks and also external constraints, such as coding bitrate targets and other operational parameters. As is relevant to the present discussion, selections of prediction modes $m_f$, quantization parameters $Q_P$, the use of uniform or non-uniform quantizers, and/or the transform mode M may be represented by coding parameters that are provided to the syntax unit 370, which may include data representing those parameters in the data stream of coded video data output by the system 300. The controller 360 also may select between different modes of operation by which the system may generate reference images and may include metadata identifying the modes selected for each portion of coded data.

During operation, the controller 360 may revise operational parameters of the quantizer 316 and the transform unit 315 at different granularities of image data, either on a per pixel block basis or on a larger granularity (for example, per picture, per slice, per largest coding unit ("LCU") or another region). In an aspect, the quantization parameters may be revised on a per-pixel basis within a coded picture.

Additionally, as discussed, the controller 360 may control operation of the in-loop filter 330 and the prediction unit 350. Such control may include, for the prediction unit 350, mode selection (lambda, modes to be tested, search windows, distortion strategies, etc.), and, for the in-loop filter 330, selection of filter parameters, reordering parameters, weighted prediction, etc.

The selection of transform modes M, quantization parameters $Q_p$, filter parameters, and other coding parameters described above are the types of coding parameters that may be assigned pixel blocks as described above.

As indicated, the predictor 350 may select a coding mode for a given pixel block based on rate-distortion optimization (RDO). In an embodiment, each candidate coding mode available by the intra-predictor 353 and the inter-predictor 352 may assessed a coding cost according to a model:

$$J(m)=D(m)+\lambda \cdot R(m), \text{ where} \quad (2)$$

J(m) represents the coding cost of a candidate coding mode m, D(m) represents an estimated distortion of coding the input pixel block according to the candidate mode, R(m) represents a coding bit rate that will be incurred by coding the pixel block according to the candidate mode m and λ represents a weighting factor. In an aspect, the distortion D(m) may be derived to include contribution from visual perception of noise associated with the candidate coding mode m, for example, as:

$$D(m)=\text{Error}(m)+a \cdot |RE(m)-w \cdot SE(m)| \quad (3)$$

where Error(m) represents coding errors obtained from the candidate coding mode m, RE(m) represents energy of a reconstructed pixel block associated with mode m, SE(m) represents energy of a source pixel block associated with mode m, w represents a target energy weight for the candidate mode m and a is a weighting factor.

The error term, Error(m), may be computed in a variety of ways. For example, it may be computed as sum of squared errors (SSE) or as a mean squared error (MSE) computation. Alternatively, the error term may be derived using loss functions as in Bayesian estimation.

The energy terms, RE(m) and SE(m), may be derived in a variety of ways. For example, they may be computed as variances of pixel values taken from the respective pixel blocks. Alternatively, they may be derived from frequency analyses of the respective pixel blocks, for example, by frequency coefficients obtained from transforms of the respective pixel blocks. In either case, energy values RE(m) and SE(m) may be derived using equivalent techniques so they may be compared to each other as shown in equation (3).

The weight term w may be set to maintain consistency across a predetermined span of the video sequence. In an aspect, the weight w may be set based on observed noise characteristics developed from prior coding operations. For example, the weight w may be estimated from reference pictures of a current picture based on a comparison of a reconstructed version of the reference picture as stored in the reference picture store 340 with the source image of the reference picture. In this variant, the weight w may be set consistently for all frames coded from a common set of reference pictures. Alternatively, the weight w may be set on a scene by scene basis, based on a comparison of a reconstructed version of a first frame following detection of a scene cut (usually, an intra decoder refresh frame) with the source image of that frame. In another variant, the weight w may be set on a group of pictures (commonly, "GOP") basis, based on a comparison of a reconstructed version of a first frame following detection of a scene cut (usually, an intra decoder refresh frame) with the source image of that frame.

In a further aspect, common weight values w may be set based on commonalities observed in the source video data. For example, frames may be analyzed based on their content to identify characteristics of the frames. The frames may be analyzed to identify objects in the frame, frame coloration and/or brightness, spatial complexity of frame content, frame-to-frame motion, and the like. Frames may be grouped together based on commonality among characteristics in content and, when frames are grouped together, they may be assigned common weight values. In this manner, frames with common visual characteristics may be assigned common weight values w, which increases the likelihood that a predictor 350 will code the frames with common noise characteristics.

In another aspect, common weight values w may be assigned in a multi-pass encoder. That is, a coder 300 may code source video of a frame, a scene or a GOP, in a first pass, and compare reconstructed pixel blocks to source pixel blocks to derive w values obtained by the first pass encoding. Thereafter, the coder 300 may derive a w value for the distortion calculations D(m) from those first pass weight values to be applied in coding the pixel blocks of the frame, scene or GOP in a second pass.

In a further aspect, weight values may be derived from codings of different representations of video. For example, in many adaptive bitrate streaming applications, a single video is coded multiple times at multiple different bitrates.

For example, the video may be coded as a 5 MB/s coding, a 2 MB/s coding and a 1 MB/s coding. To achieve the different coded representations, the video may be altered in resolution, frame rate or some other parameter. In such an embodiment, however, coding weight values w may be assigned to pixel blocks based on weight values that are derived from coding other representations. Thus, the weight values for one coded representation may be "reused" when coding the same content of another coded representation despite possible changes in frame resolution or other parameters.

Having estimated distortion D(m) of the candidate coding modes m based on energy of source and reconstructed pixel blocks and based on a weight factor w, the predictor 350 may select a final coding mode $m_f$, which is selected for coding. The predictor 350 may output an identifier of the selected coding mode mf and other metadata associated with the selected coding mode (typically, as appropriate, motion vectors and reference picture identifiers).

Figure 4:
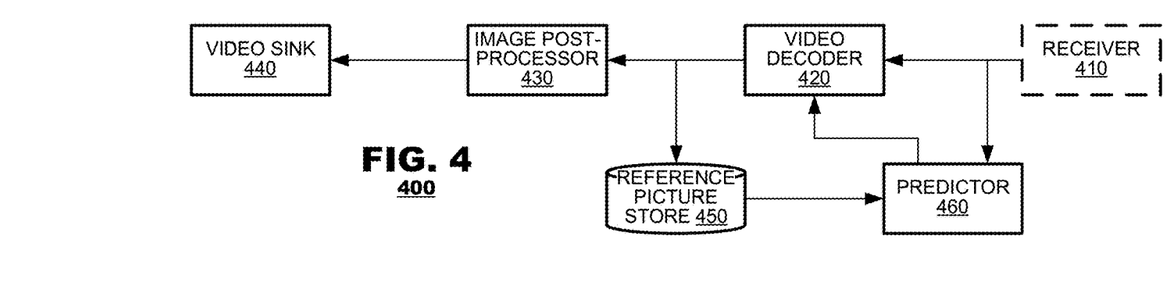
FIG. 4 is a functional block diagram of a decoder device according to an aspect of the present disclosure.

FIG. 4 is a functional block diagram of a decoder device 400 according to an aspect of the present disclosure. The decoding system 400 may include a receiver 410, a video decoder 420, an image processor 430, a video sink 440, a reference picture store 450 and a predictor 460. The receiver 410 may receive coded video data from a channel and route it to the video decoder 420. The video decoder 420 may decode the coded video data with reference to prediction data supplied by the predictor 460.

The predictor 460 may receive prediction metadata in the coded video data, retrieve content from the reference picture store 450 in response thereto, and provide the retrieved prediction content to the video decoder 420 for use in decoding.

The video sink 440, as indicated, may consume decoded video generated by the decoding system 400. Video sinks 440 may be embodied by, for example, display devices that render decoded video. In other applications, video sinks 440 may be embodied by computer applications, for example, gaming applications, virtual reality applications and/or video editing applications, that integrate the decoded video into their content.

Figure 5:
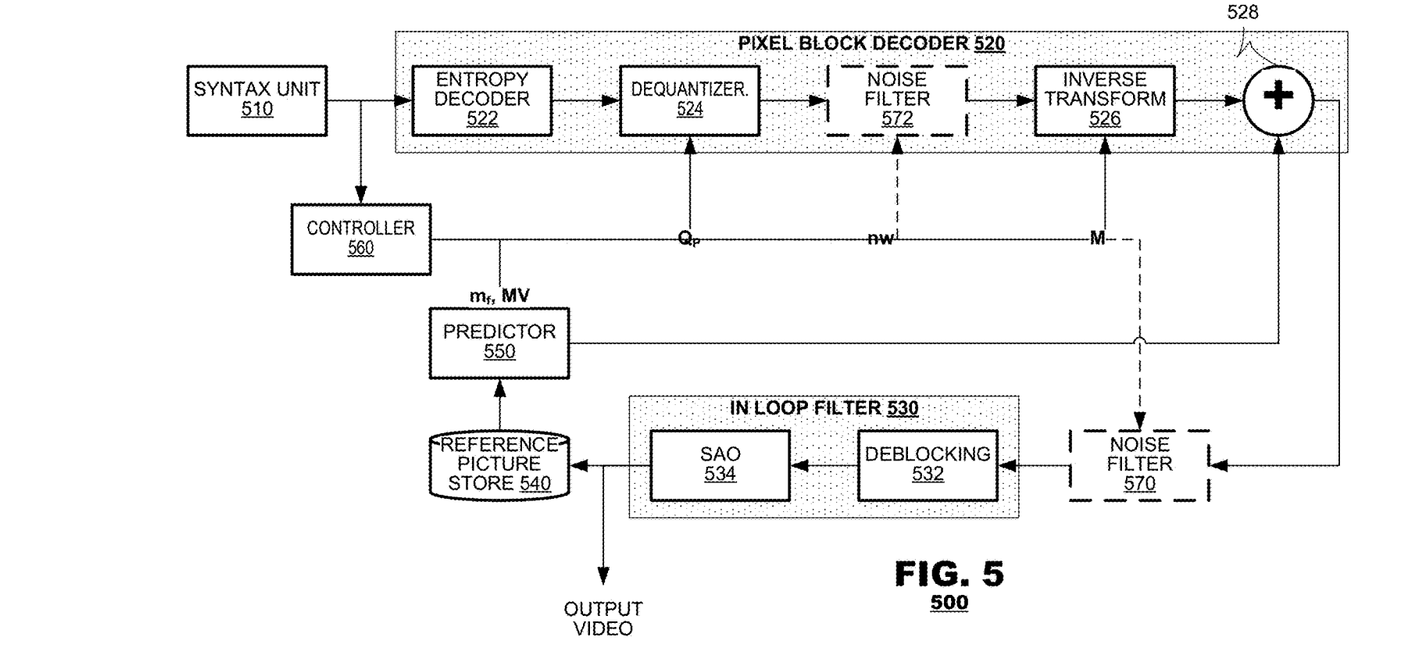
FIG. 5 is a functional block diagram of a decoding system according to an aspect of the present disclosure.

FIG. 5 is a functional block diagram of a decoding system 500 according to an aspect of the present disclosure. The decoding system 500 may include a syntax unit 510, a pixel block decoder 520, an in-loop filter 530, a reference picture store 540, a predictor 550, and a controller 560. The syntax unit 510 may receive a coded video data stream and may parse the coded data into its constituent parts. Data representing coding parameters may be furnished to the controller 560 while data representing coded residuals (the data output by the pixel block coder 310 of FIG. 3) may be furnished to the pixel block decoder 520. The pixel block decoder 520 may invert coding operations provided by the pixel block coder 310 (FIG. 3). The in-loop filter 530 may filter reconstructed pixel block data. The reconstructed pixel block data may be assembled into pictures for display and output from the decoding system 500 as output video. The pictures also may be stored in the prediction buffer 540 for use in prediction operations. The predictor 550 may supply prediction data to the pixel block decoder 520 as determined by coding mode data $m_f$ and associated parameter data received in the coded video data stream.

The pixel block decoder 520 may include an entropy decoder 522, a dequantizer 524, an inverse transform unit 526, and an adder 528. The entropy decoder 522 may perform entropy decoding to invert processes performed by the entropy coder 318 (FIG. 3). The dequantizer 524 may invert operations of the quantizer 516 of the pixel block coder 310 (FIG. 3). Similarly, the inverse transform unit 526 may invert operations of the transform unit 314 (FIG. 3). They may use the quantization parameters $Q_P$ and transform modes M that are provided in the coded video data stream. Because quantization is likely to truncate data, the data recovered by the dequantizer 524, likely will possess coding errors when compared to the input data presented to its counterpart quantizer 516 in the pixel block coder 310 (FIG. 3).

The adder 528 may invert operations performed by the subtractor 312 (FIG. 3). It may receive a prediction pixel block from the predictor 550 as determined by prediction references in the coded video data stream. The adder 528 may add the prediction pixel block to reconstructed residual values output by the inverse transform unit 526 and may output reconstructed pixel block data.

The in-loop filter 530 may perform various filtering operations on reconstructed pixel block data. As illustrated, the in-loop filter 530 may include a deblocking filter 532 and an SAO filter 534. The deblocking filter 532 may filter data at seams between reconstructed pixel blocks to reduce discontinuities between the pixel blocks that arise due to coding. SAO filters 534 may add offset to pixel values according to an SAO type, for example, based on edge direction/shape and/or pixel level. Other types of in-loop filters may also be used in a similar manner. Operation of the deblocking filter 532 and the SAO filter 534 ideally would mimic operation of their counterparts in the coding system 300 (FIG. 3). Thus, in the absence of transmission errors or other abnormalities, the decoded picture obtained from the in-loop filter 530 of the decoding system 500 would be the same as the decoded picture obtained from the in-loop filter 310 of the coding system 300 (FIG. 3); in this manner, the coding system 300 and the decoding system 500 should store a common set of reference pictures in their respective reference picture stores 340, 540.

The reference picture store 540 may store filtered pixel data for use in later prediction of other pixel blocks. The reference picture store 540 may store decoded pixel block data of each picture as it is coded for use in intra prediction. The reference picture store 540 also may store decoded reference pictures.

As discussed, the predictor 550 may supply the transformed reference block data to the pixel block decoder 520. The predictor 550 may supply predicted pixel block data as determined by the prediction mode data $m_f$ and other indicators supplied in the coded video data stream.

The controller 560 may control overall operation of the coding system 500. The controller 560 may set operational parameters for the pixel block decoder 520 and the predictor 550 based on parameters received in the coded video data stream. As is relevant to the present discussion, these operational parameters may include quantization parameters $Q_P$ for the dequantizer 524 and transform modes M for the inverse transform unit 510. As discussed, the received parameters may be set at various granularities of image data, for example, on a per pixel block basis, a per picture basis, a per slice basis, a per LCU basis, or based on other types of regions defined for the input image.

In another aspect of the disclosure, coded video data may carry syntax elements that may be used by a decoder 500 to change the decoded signal energy on a block basis. In one aspect, coded video data may carry an optional per block noise weight nw that controls a noise injection within the decoder 500. If provided, the noise weight nw may be used to inject noise of predetermined characteristics into recovered pixel block data. For example, it may be used to inject film grain noise into recovered pixel block data by a noise filter 570 coupled to an output of the pixel block decoder 520. Alternatively, the noise weight nw may be used to scale the non-DC frequency components of the block (to change the perceived noise level) by a noise filter 572 provided within the pixel block decoder 520. The weights can be carried in slice/picture level of the coding syntax, with adjustments provided at a block level.

In another aspect, the coded video data may carry slice/picture/sequence level noise weights to specify an array of noise levels or a single noise level. On a per block basis, an index may be signaled to specify what noise level from the array should be applied to each pixel, and the decoder 500 may inject noise of the specified level into a reconstructed pixel block. In a further aspect, an array of noise levels may be encoded predictively, with only the prediction error is sent in the bit stream. The per-block level noise level can be turned on/off at picture/slice/sequence or block level.

Noise weights nw may be provided by an encoder (FIG. 2) during coding of the video data. The encoder may compare reconstructed pixel blocks to their source data and estimate losses. From the estimated losses, the encoder may derived parameters of the noise filter(s) 570, 572 that, when applied by a decoder, further reduce the losses.

Figure 6:
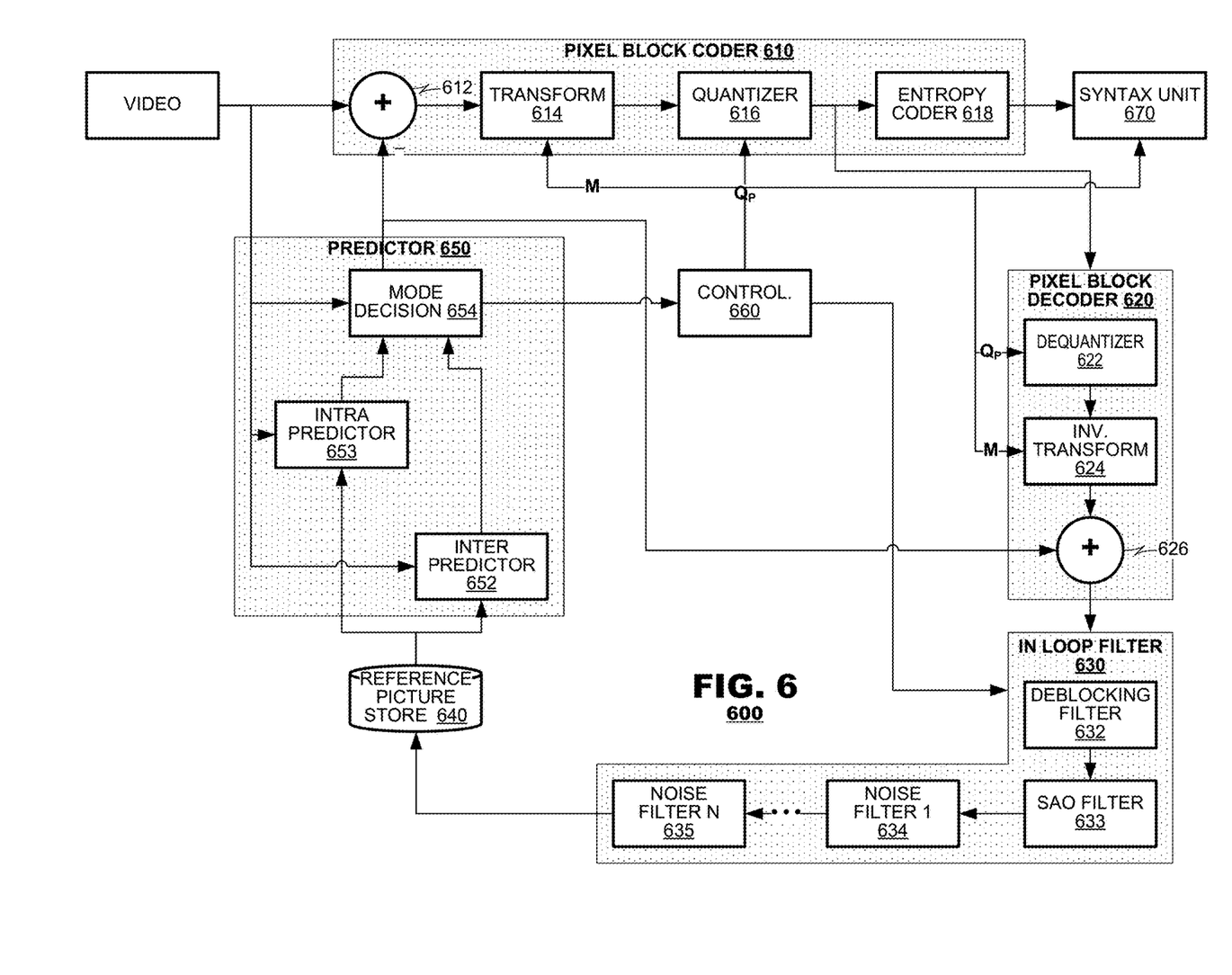
FIG. 6 is a functional block diagram of a coding system according to an aspect of the present disclosure.

FIG. 6 is a functional block diagram of a coding system 600 according to an aspect of the present disclosure. The system 600 may include a pixel block coder 610, a pixel block decoder 620, an in-loop filter system 630, a reference picture store 640, a predictor 650, a controller 660, and a syntax unit 670. The pixel block coder and decoder 610, 620 and the predictor 650 may operate iteratively on individual pixel blocks of a frame. The predictor 650 may predict data for use during coding of a newly-presented input pixel block. The pixel block coder 610 may code the new pixel block by predictive coding techniques and present coded pixel block data to the syntax unit 670. The pixel block decoder 620 may decode the coded pixel block data, generating decoded pixel block data therefrom. The in-loop filter 630 may perform various filtering operations on a decoded picture that is assembled from the decoded pixel blocks obtained by the pixel block decoder 620. The filtered picture may be stored in the reference picture store 640 where it may be used as a source of prediction of a later-received pixel block. The syntax unit 670 may assemble a data stream from the coded pixel block data, which conforms, to a governing coding protocol.

The pixel block coder 610 may include a subtractor 612, a transform unit 614, a quantizer 616, and an entropy coder 618. The pixel block coder 610 may accept pixel blocks of input data at the subtractor 612. The subtractor 612 may receive predicted pixel blocks from the predictor 650 and generate an array of pixel residuals therefrom representing a difference between the input pixel block and the predicted pixel block. The transform unit 614 may apply a transform to the sample data output from the subtractor 612, to convert data from the pixel domain to a domain of transform coefficients. The quantizer 616 may perform quantization of transform coefficients output by the transform unit 614. The quantizer 616 may be a uniform or a non-uniform quantizer. The entropy coder 618 may reduce bandwidth of the output of the coefficient quantizer by coding the output, for example, by variable length code words.

The transform unit 614 may operate in a variety of transform modes as determined by the controller 660. For example, the transform unit 614 may apply a discrete cosine transform (DCT), a discrete sine transform (DST), a Walsh-Hadamard transform, a Haar transform, a Daubechies wavelet transform, or the like. In an aspect, the controller 660 may select a coding mode M to be applied by the transform unit 615, may configure the transform unit 615 accordingly and may signal the coding mode M in the coded video data, either expressly or impliedly.

The quantizer 616 may operate according to a quantization parameter $Q_P$ that is supplied by the controller 660. In another aspect, the quantization parameter $Q_P$ may be applied to the transform coefficients as a multi-value quantization parameter, which may vary, for example, across different coefficient locations within a transform-domain pixel block. Thus, the quantization parameter $Q_P$ may be provided as a quantization parameters array.

The entropy coder 618, as its name implies, may perform entropy coding of data output from the quantizer 616. For example, the entropy coder 618 may perform run length coding, Huffman coding, Golomb coding and the like.

The pixel block decoder 620 may invert coding operations of the pixel block coder 610. For example, the pixel block decoder 620 may include a dequantizer 622, an inverse transform unit 624, and an adder 626. The pixel block decoder 620 may take its input data from an output of the quantizer 616. Although permissible, the pixel block decoder 620 need not perform entropy decoding of entropy-coded data since entropy coding is a lossless event. The dequantizer 622 may invert operations of the quantizer 616 of the pixel block coder 610. The dequantizer 622 may perform uniform or non-uniform de-quantization as specified by the decoded signal $Q_P$. Similarly, the inverse transform unit 624 may invert operations of the transform unit 614. The dequantizer 622 and the inverse transform unit 624 may use the same quantization parameters $Q_P$ and transform mode M as their counterparts in the pixel block coder 610. Quantization operations likely will truncate data in various respects and, therefore, data recovered by the dequantizer 622 likely will possess coding errors when compared to the data presented to the quantizer 616 in the pixel block coder 610.

The adder 626 may invert operations performed by the subtractor 612. It may receive the same prediction pixel block from the predictor 650 that the subtractor 612 used in generating residual signals. The adder 626 may add the prediction pixel block to reconstructed residual values output by the inverse transform unit 624 and may output reconstructed pixel block data.

The in-loop filter 630 may perform various filtering operations on recovered pixel block data. For example, the in-loop filter 630 may include a deblocking filter 632, a sample adaptive offset ("SAO") filter 633, and one or more noise filters 633-635. The deblocking filter 632 may filter data at seams between reconstructed pixel blocks to reduce discontinuities between the pixel blocks that arise due to coding. SAO filters may add offsets to pixel values according to an SAO "type," for example, based on edge direction/shape and/or pixel/color component level. The noise filters 633-635 may add noise to frame data output by the SAO filter 633. The in-loop filter 630 may operate according to parameters that are selected by the controller 660.

The reference picture store 640 may store filtered pixel data for use in later prediction of other pixel blocks. Different types of prediction data are made available to the predictor 650 for different prediction modes. For example, for an input pixel block, intra prediction takes a prediction reference from decoded data of the same picture in which the input pixel block is located. Thus, the reference picture store 640 may store decoded pixel block data of each picture as it is coded. For the same input pixel block, inter prediction may take a prediction reference from previously coded and decoded pictures that are designated as reference pictures. Thus, the reference picture store 640 may store these decoded reference pictures.

As discussed, the predictor 650 may supply prediction data to the pixel block coder 610 for use in generating residuals. The predictor 650 may include an inter predictor 652, an intra predictor 653 and a mode decision unit 654. The inter predictor 652 may receive pixel block data representing a new pixel block to be coded and may search reference picture data from store 640 for pixel block data from reference pictures for use in coding the input pixel block. The inter predictor 652 may support a plurality of prediction modes, such as P mode coding and B mode coding. The inter predictor 652 may select an inter prediction mode and an identification of candidate prediction reference data that provides a closest match to the input pixel block being coded. The inter predictor 652 may generate prediction reference metadata, such as motion vectors, to identify which portion(s) of which reference pictures were selected as source(s) of prediction for the input pixel block.

The intra predictor 653 may support Intra (I) mode coding. The intra predictor 653 may search from among pixel block data from the same picture as the pixel block being coded that provides a closest match to the input pixel block. The intra predictor 653 also may generate prediction reference indicators to identify which portion of the picture was selected as a source of prediction for the input pixel block.

The mode decision unit 654 may select a final coding mode $m_f$ to be applied to the input pixel block. Typically, as described above, the mode decision unit 654 selects the prediction mode as an optimization of coding rate and distortion in which a coding mode that minimizes rate-distortion cost is selected. Exceptions may arise when coding modes are selected to satisfy other policies to which the coding system 600 adheres, such as satisfying a particular channel behavior, or supporting random access or data refresh policies. When the mode decision selects the final coding mode, the mode decision unit 654 may output a selected reference block from the store 640 to the pixel block coder and decoder 610, 620 and may supply to the controller 660 an identification of the selected prediction mode along with the prediction reference indicators corresponding to the selected mode. The predictor 650 may operate according to the techniques described above in FIG. 3.

The controller 660 may control overall operation of the coding system 600. The controller 660 may select operational parameters for the pixel block coder 610 and the predictor 650 based on analyses of input pixel blocks and also external constraints, such as coding bitrate targets and other operational parameters. As is relevant to the present discussion, selections of prediction modes $m_f$, quantization parameters $Q_P$, the use of uniform or non-uniform quantizers, and/or the transform mode M may be represented by coding parameters that are provided to the syntax unit 670, which may include data representing those parameters in the data stream of coded video data output by the system 600. The controller 660 also may select between different modes of operation by which the system may generate reference images and may include metadata identifying the modes selected for each portion of coded data.

During operation, the controller 660 may revise operational parameters of the quantizer 616 and the transform unit 615 at different granularities of image data, either on a per pixel block basis or on a larger granularity (for example, per picture, per slice, per largest coding unit ("LCU") or another region). In an aspect, the quantization parameters may be revised on a per-pixel basis within a coded picture.

Additionally, as discussed, the controller 660 may control operation of the in-loop filter 630 and the prediction unit 650. Such control may include, for the prediction unit 650, mode selection (lambda, modes to be tested, search windows, distortion strategies, etc.), and, for the in-loop filter 630, selection of filter parameters, reordering parameters, weighted prediction, etc.

The selection of transform modes M, quantization parameters $Q_P$, filter parameters, and other coding parameters described above are the types of coding parameters that may be assigned pixel blocks as described above.

During operation, the encoder 600 may code pixel blocks by the pixel block coder 610, then decode the pixel blocks by the pixel block decoder 620 and generate recovered frames therefrom. The in loop filter 630 may filter the recovered frame data by deblocking and SAO filtering. Thereafter, the encoder 600 may estimate differences between the recovered frame data and the source frame data from which it was generated. The encoder 600 may derive filter parameters for the filter(s) 633-635 that reduce the differences between the recovered frame data and its source frame. Once settings are derived that reduce such differences, they may be applied to the recovered frame data before it is stored in the reference picture store 640. Filter settings also may be transmitted from the encoder 600 with the coded video data. In one aspect, the filter settings may be derived from the weight values w discussed hereinabove in connection with equations (2) and (3)

Figure 7:
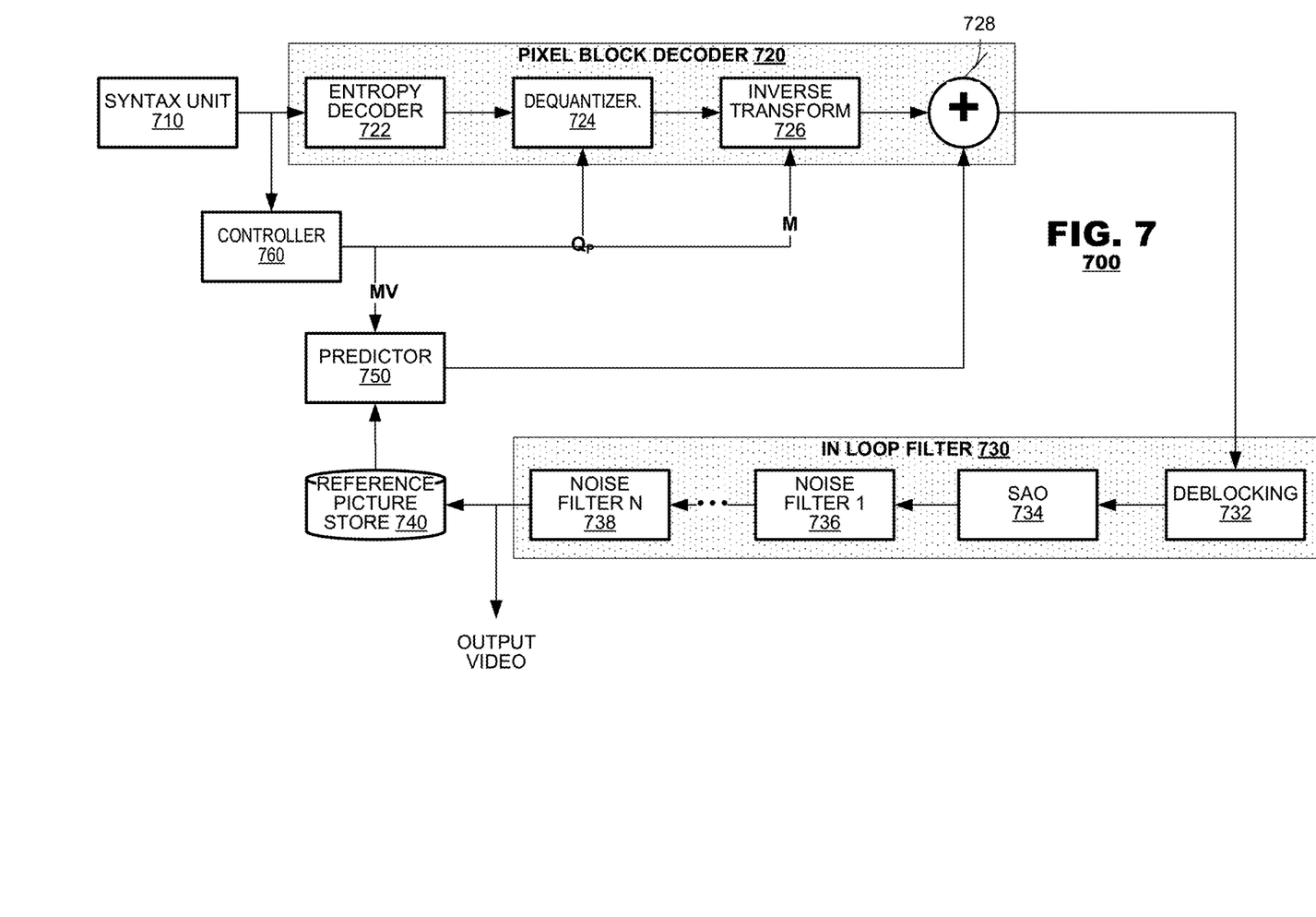
FIG. 7 is a functional block diagram of a decoding system according to an aspect of the present disclosure.

FIG. 7 is a functional block diagram of a decoding system 700 according to an aspect of the present disclosure. The decoding system 700 may include a syntax unit 710, a pixel block decoder 720, an in-loop filter 730, a reference picture store 740, a predictor 750, and a controller 760. The syntax unit 710 may receive a coded video data stream and may parse the coded data into its constituent parts. Data representing coding parameters may be furnished to the controller 760 while data representing coded residuals (the data output by the pixel block coder 610 of FIG. 6) may be furnished to the pixel block decoder 720. The pixel block decoder 720 may invert coding operations provided by the pixel block coder 610 (FIG. 6). The in-loop filter 730 may filter reconstructed pixel block data. The reconstructed pixel block data may be assembled into pictures for display and output from the decoding system 700 as output video. The pictures also may be stored in the prediction buffer 740 for use in prediction operations. The predictor 750 may supply prediction data to the pixel block decoder 720 as determined by coding mode data ITU and associated parameter data received in the coded video data stream.

The pixel block decoder 720 may include an entropy decoder 722, a dequantizer 724, an inverse transform unit 726, and an adder 728. The entropy decoder 722 may perform entropy decoding to invert processes performed by the entropy coder 618 (FIG. 6). The dequantizer 724 may invert operations of the quantizer 716 of the pixel block coder 610 (FIG. 6). Similarly, the inverse transform unit 726 may invert operations of the transform unit 614 (FIG. 6). They may use the quantization parameters $Q_P$ and transform modes M that are provided in the coded video data stream. Because quantization is likely to truncate data, the data recovered by the dequantizer 724, likely will possess coding errors when compared to the input data presented to its counterpart quantizer 716 in the pixel block coder 610 (FIG. 6).

The adder 728 may invert operations performed by the subtractor 612 (FIG. 6). It may receive a prediction pixel block from the predictor 750 as determined by prediction references in the coded video data stream. The adder 728 may add the prediction pixel block to reconstructed residual values output by the inverse transform unit 726 and may output reconstructed pixel block data.

The in-loop filter 730 may perform various filtering operations on reconstructed pixel block data. As illustrated, the in-loop filter 730 may include a deblocking filter 732, an SAO filter 734 and one or more noise filters 736-738. The deblocking filter 732 may filter data at seams between reconstructed pixel blocks to reduce discontinuities between the pixel blocks that arise due to coding. SAO filters 734 may add offset to pixel values according to an SAO type, for example, based on edge direction/shape and/or pixel level. The noise filter(s) 736-738 may inject noise having predetermined characteristics into filtered frame data output by the SAO filter 734. Other types of in-loop filters may also be used in a similar manner. Operation of the deblocking filter 732, the SAO filter 734 and the noise filter(s) 736-738 ideally would mimic operation of their counterparts in the coding system 600 (FIG. 6). Thus, in the absence of transmission errors or other abnormalities, the decoded picture obtained from the in-loop filter 730 of the decoding system 700 would be the same as the decoded picture obtained from the in-loop filter 610 of the coding system 600 (FIG. 6); in this manner, the coding system 600 and the decoding system 700 should store a common set of reference pictures in their respective reference picture stores 640, 740.

The reference picture store 740 may store filtered pixel data for use in later prediction of other pixel blocks. The reference picture store 740 may store decoded pixel block data of each picture as it is coded for use in intra prediction. The reference picture store 740 also may store decoded reference pictures.

As discussed, the predictor 750 may supply the transformed reference block data to the pixel block decoder 720. The predictor 750 may supply predicted pixel block data as determined by the prediction mode data $m_f$ and other indicators supplied in the coded video data stream.

The controller 760 may control overall operation of the coding system 700. The controller 760 may set operational parameters for the pixel block decoder 720 and the predictor 750 based on parameters received in the coded video data stream. As is relevant to the present discussion, these operational parameters may include quantization parameters $Q_P$ for the dequantizer 724 and transform modes M for the inverse transform unit 710. As discussed, the received parameters may be set at various granularities of image data, for example, on a per pixel block basis, a per picture basis, a per slice basis, a per LCU basis, or based on other types of regions defined for the input image.

As in the embodiment of FIG. 5, the noise filter parameters may be defined expressly in the coded video data of each block. Alternatively, a noise filter parameter may be defined at a slice level, a frame level or a sequence level in the coded video data, with block-by-block adjustments to the parameter being provided at the block-level. In a further aspect, filter arrays may be defined at a slice, frame or sequence level in coded video data with references to individual array positions being provided at the block level.

The foregoing discussion has described operation of the aspects of the present disclosure in the context of video coders and decoders. Commonly, these components are provided as electronic devices. Video encoder and decoder devices can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones, media players, and/or computer servers. Such computer programs typically are stored in physical storage media such as electronic-, magnetic- and/or optically-based storage devices, where they are read to a processor and executed. And, of course, these components may be provided as hybrid systems that distribute functionality across dedicated hardware components and programmed general-purpose processors, as desired.

Figure 8:
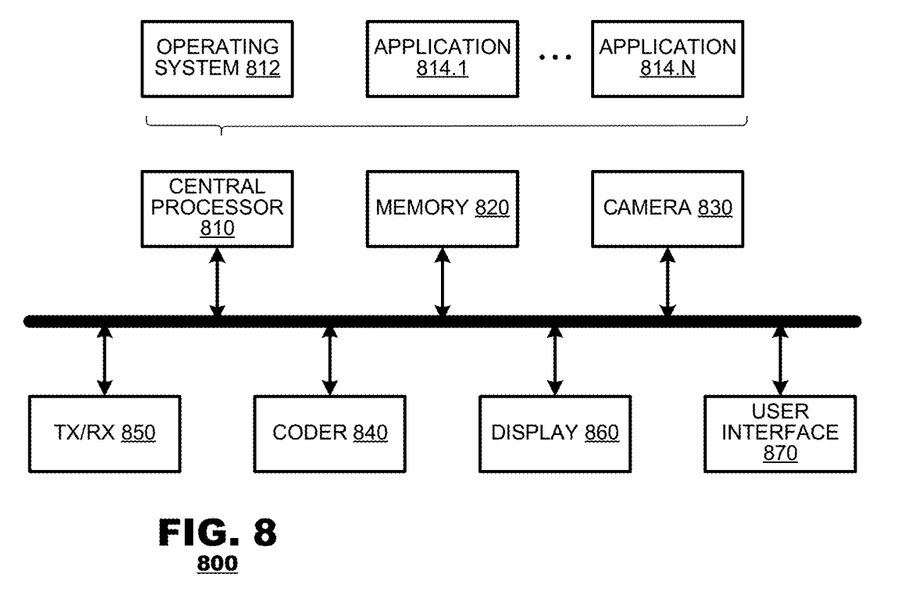
FIG. 8 illustrates an exemplary computer system suitable for use with aspects of the present disclosure described herein.

For example, the techniques described herein may be performed by a central processor of a computer system. FIG. 8 illustrates an exemplary computer system 800 that may perform such techniques. The computer system 800 may include a central processor 810 and a memory 820. The central processor 810 may read and execute various program instructions stored in the memory 820 that define an operating system 812 of the system 800 and various applications 814.1-814.N.

As indicated, the memory 820 may store program instructions that, when executed, cause the processor to perform the techniques described hereinabove. The memory 820 may store the program instructions on electrical-, magnetic- and/or optically-based storage media.

The system 800 may possess other components as may be consistent with the system's role as an image source device, an image sink device or both. Thus, in a role as an image source device, the system 800 may possess one or more cameras 830 that generate the video. Alternatively, it may execute an application 814.1 that generates video to be coded. The system 800 also may possess a coder 840 to perform video coding on the video and a transmitter 850 (shown as TX) to transmit data out from the system 800. The coder 850 may be provided as a hardware device (e.g., a processing circuit separate from the central processor 800) or it may be provided in software as an application 814.1.

In a role as an image sink device, the system 800 may possess a receiver 850 (shown as RX), a coder 840, a display 860 and user interface elements 870. The receiver 850 may receive data and the coder 840 may decode the data. The display 860 may be a display device on which content of the view window is rendered. The user interface 870 may include component devices (such as motion sensors, touch screen inputs, keyboard inputs, remote control inputs and/or controller inputs) through which operators input data to the system 800.

Further, a given device may operate in dual roles both as an encoder and a decoder. For example, when supporting a video conferencing application, a single device 800 may capture video data of a local environment, code it and transmit the coded video to another device while, at the same time, receiving coded video from the other device, decoding it and rendering it on a local display 860.

Several aspects of the present disclosure are specifically illustrated and described herein. However, it will be appreciated that modifications and variations of the present disclosure are covered by the above teachings and within the purview of the appended claims without departing from the spirit and intended scope of the disclosure.

We claim:

1. A method of coding an input pixel block, comprising: for a candidate coding mode of a plurality of candidate coding modes:
    estimating coding cost of the candidate coding mode
        based on estimated distortion of the candidate coding mode, the estimated distortion including an estimate of noise associated with the candidate coding mode, selecting a coding mode for the input pixel block based on a comparison of the estimated noise of the plurality of candidate coding modes with estimated noise of a coded pixel block from a previously-coded frame, and coding the input pixel block according to the selected coding mode.

2. The method of claim 1, wherein, for at least one coding mode, the estimate of noise is based on a comparison of energy of the input pixel block and energy of a reconstructed pixel block to be obtained from the candidate coding mode.

3. The method of claim 1, wherein, for at least one coding mode, the estimate of noise is based on a comparison of variance of the input pixel block and variance of a reconstructed pixel block to be obtained from the candidate coding mode.

4. The method of claim 1, wherein, for at least one coding mode, the estimate of noise is based on a comparison of frequency analyses performed on the input pixel block and on a reconstructed pixel block to be obtained from the candidate coding mode.

5. The method of claim 1, wherein, for at least one coding mode, the coding cost is based on estimated noise of a coded reference picture associated with the coding mode.

6. The method of claim 1, wherein, for at least one coding mode, the coding cost is based on estimated noise of a coded instantaneous decoder refresh frame that precedes the input pixel block.

7. The method of claim 1, wherein, for at least one coding mode, the coding cost is based on estimated noise of other frames having similar content as a frame in which the input pixel block is present.

8. The method of claim 1, wherein, for at least one coding mode, the coding cost is based on estimated noise of a coded reference picture associated with a scene cut that precedes the input pixel block.

9. The method of claim 1, further comprising transmitting, in coded video data, an indicator of estimated noise of the selected coded mode.

10. A decoding method, comprising:
    decoding coded video data of a pixel block,
    responsive to a filter parameter contained in the coded video data, performing noise injection filtering on decoded video data of the pixel block, wherein the filter parameter is determined by the encoder based on a comparison between reconstructed pixel blocks and their source blocks.

11. The method of claim 10, further comprising storing the filtered pixel block in a reference picture buffer.

12. The method of claim 10, wherein the noise injection filtering is performed in a loop filtering system of a decoder.

13. The method of claim 10, wherein the noise filtering is performed on frequency coefficients of coded video data prior to transforming the coefficients to a pixel domain.

14. The method of claim 10, wherein the filter parameter is contained in a block level of a coding syntax of the coded video data and identified as an adjustment to another parameter contained in a level of the coding syntax higher than the block level.

15. The method of claim 10, wherein the filter parameter is an index into an array of filter parameters.

16. A video decoder system, comprising:
    a decoder having an input for coded video data,
    a filter system having an input for recovered video data output from the decoder, the filter system having at least one noise injection filter therein, wherein the at least one noise injection filter operates according to a filter parameter determined based on a comparison between a reconstructed frame and its source frame, and
    a reference picture store for storing filtered frames output by the filter system.

17. The system of claim 16, wherein the filter parameter is contained in the coded video data.

18. The system of claim 16, wherein the filter parameter is contained in a block level of a coding syntax of the coded video data and identified as an adjustment to another parameter contained in a level of the coding syntax higher than the block level.

19. The system of claim 16, wherein the filter parameter is an index into an array of filter parameters.

20. A video coding system, comprising:
    a forward coder having an input for source frame data and an output for coded video data,
    a decoder having an input for the coded video data output from the forward coder,
    a filter system having an input for recovered video data output from the decoder, the filter system having at least one noise injection filter therein, wherein the at least one noise injection filter operates according to a filter parameter determined based on a comparison between a reconstructed frame and its source frame, and
    a reference picture store for storing filtered frames output by the filter system.

21. The video coding system of claim 20, wherein the at least one noise injection filter operates according to filter parameters derived by the video coding system and transmitted from the video coding system with coded video data.

22. A video decoder system, comprising:
    a pixel block decoder, receiving coded pixel block data and predicted pixel block data, the pixel block decoder comprising an inverse transform unit and a noise injection filter provided before the inverse transform unit,
    a reference picture store, and
    a predictor, having an input for prediction data associated with coded pixel blocks, an input coupled to the reference picture store, and an output providing the predicted pixel block data.

23. A video decoder system, comprising:
    a pixel block decoder, having an input for coded pixel block data and an output for decoded pixel block data,
    a filter system having an input for the decoded pixel block data, having multiple states of filters including a noise injection filter, wherein the noise injection filter uses a filter parameter determined by an encoder based on a comparison between reconstructed pixel blocks and their source blocks, and
    a reference picture store having an input coupled to an output of the filter system.

24. The method of claim 1, wherein the comparison of the estimated noise of the plurality of candidate coding modes with estimated noise of a coded pixel block from a previously-coded frame is based on a target energy weight.

25. The method of claim 24, wherein the target energy weight is determined based on noise characteristics developed from prior coding operations, the determining comprises a comparison between reference blocks and their corresponding input pixel blocks.

26. The method of claim 24, wherein the target energy weight is determined uniformly for all input pixel blocks from frames that coded from a common set of reference pictures and the determining is based on comparisons between reference pictures from the common set of reference pictures and their corresponding source images.

27. The method of claim 24, wherein following a detection of a new scene, the target energy weight is determined based on a comparison of a first frame of the new scene and a reconstructed version of the first frame.

28. The method of claim 24, wherein the target energy weight is determined based on information extracted from one or more frames associated with the input pixel block, comprising certain objects, coloration, brightness, spatial content complexity, motion, or a combination thereof.

29. The method of claim 24, wherein the target energy weight is determined using a multi-pass encoder, wherein:
- a frame, a scene or a GOP is coded in a first pass of coding,
- the target energy weight is determined based on comparison of reconstructed pixel blocks from the first pass of coding and corresponding source pixel blocks, and
- the determined target energy weight is applied to the coding of pixel blocks in a second pass of coding of the respective frame, scene, or GOP.

30. The method of claim 24, wherein the target energy weight is derived from target energy weights used in another coding of a video of the input pixel block, wherein the other coding is carried out using different video bitrate, video resolution, or a combination thereof.

* * * * *